United States Patent [19]

Den Bleyker

[11] Patent Number: 4,828,578
[45] Date of Patent: May 9, 1989

[54] INTERNALLY CHANNELLED GASIFIER QUENCH RING

[75] Inventor: Alfred L. Den Bleyker, Houston, Tex.

[73] Assignee: Texaco Inc., White Plains, N.Y.

[21] Appl. No.: 161,583

[22] Filed: Feb. 29, 1988

[51] Int. Cl.[4] .............................................. C10S 3/48
[52] U.S. Cl. .................... 48/69; 48/DIG. 2; 55/256
[58] Field of Search ............... 48/63, 64, 76, 77, 67, 48/69, DIG. 2, 197 R, 206; 55/240, 256; 422/207

[56] References Cited

U.S. PATENT DOCUMENTS

| 4,218,423 | 8/1986 | Robin et al. | 48/69 |
| 4,581,899 | 4/1986 | Klock et al. | 48/69 |
| 4,624,683 | 11/1986 | Dach | 48/69 |
| 4,650,497 | 3/1987 | Quintana | 48/69 |

Primary Examiner—Peter Kratz
Attorney, Agent, or Firm—Robert A. Kulason; James J. O'Loughlin; Robert B. Burns

[57] ABSTRACT

A reactor for gasifying a carbonaceous fuel to produce usable gas, and comprising an insulated outer shell. A reaction chamber within the shell which receives a fuel mixture from an injection burner. The products or effluent of gasification include hot produced gases which are passed through a constricted throat to be cooled in a liquid bath. A dip tube which guides the hot effluent into the bath is provided with a stream of coolant from a quench ring. The latter is supported below the reaction chamber and includes a toroidal body which communicates with a pressurized water source. A narrow channel formed in said body carries a rapidly moving flow of the water to uniformly cool the effluent guide panel whereby to stabilize the latter and reduce the development of thermal strains due to contact with the hot gases.

5 Claims, 3 Drawing Sheets

INTERNALLY CHANNELLED GASIFIER QUENCH RING

BACKGROUND OF THE INVENTION

In the production of a usable synthetic gas by the combustion of a carbonaceous fuel mixture, the process is conducted most effectively under a high temperature and high pressure conditions. For example, for the production of a gas from a carbonaceous fuel such as particulated coal, coke, or even oil, a preferred operating temperature range of about 2,000–3,000° F. is maintained at a pressure of between about 5 to 250 atmospheres. The harsh operating conditions experienced in such a process, and in particular the wide temperature variations encountered, impose a severe strain on many segments of the gasifier or reactor and associated equipment.

The invention is addressed to an improvement in the structure of a gasifier, and particularly in the quench ring and the dip tube arrangement. The latter by their functions, are exposed to the gasifier's severest temperature conditions by virtue of the hot produced gas or effluent which contacts these members as the gas passes from the reaction chamber.

With respect to the prior art, U.S. Pat. No. 4,218,423 issued on Aug. 19, 1980 in the name of Robin et al., illustrates one form of quench ring and dip tube which can be improved through use of the present arrangement. U.S. Pat. No. 4,444,726, issued on Apr. 24, 1984 in the name of Crotty et al., also illustrates a dip tube and quench ring for a reactor vessel. In the latter, a portion of the gasifier's cooling system is insulated, but does not provide an effective means to avoid or minimize the detrimental effects that could result due to the intimate contact between the hot effluent gas and the quench ring.

Among the problems encountered due to the high temperature conditions within the gasifier, is the appearance of thermal strains which often develop in the quench ring which conducts cooling water. These strains develop as a result of the ring's close proximity to the hot effluent stream, a position which necessitates cooling. The usual problems are manifested in the form of cracks and fissures which occur in parts of the quench ring, predominately in areas where sudden transitions are present. In the latter, physical and thermal strains would be magnified and ultimately result in undesired leakage of liquid coolant.

BRIEF DESCRIPTION OF THE INVENTION

Toward overcoming the stated deficiencies in gasifiers of the type contemplated, there is disclosed a gasifier quench ring having an internal, water circulating channel. The latter is defined in one embodiment by an appendage which extends from the inner side of the quench ring body, and which is enclosed by an external cover or closure plate thereby forming a water distribution ring or manifold. The coolant carrying channel covers the entire inner wall of the distribution ring whose external surface is exposed to the hot effluent, and is maintained in full condition. Said channel conducts a rapid flow of the water which is subsequently discharged against the dip tube guide face. The latter step facilitates effluent flow between the gasifier reaction chamber and the liquid bath.

Stated alternately, there is presently provided a reactor for gasifying a carbonaceous fuel mixture to produce a hot effluent comprising residual slag and at least one useful synthetic gas. The reactor includes a reaction chamber in which a fuel mixture is gasified, the floor of said chamber being shaped to permit an outflow of liquefied slag.

A quench chamber holding a water bath is positioned in the reactor lower section to receive and cool the hot effluent. A throat communicating the reaction chamber with the quench chamber directs a stream of the effluent into a dip tube. Said tube, in the usual manner, defines a guide passage to conduct the effluent into the water bath.

A toroidal shaped quench ring in the gasifier incorporates a distribution ring which is positioned above the dip tube to direct streams of the cooling water against the dip tube's guide surface.

The quench ring includes a body which defines a chamber or manifold communicated with a pressurized source of water. The manifold communicates in turn with a contiguously positioned distribution ring which receives and circulates the water through an annular coolant channel. The rapid flow of water through said channel due to its constricted passage, serves to stabilize and cool the quench ring outer wall which is exposed to the high temperature effluent.

The circulating water is then distributed against the dip tube guide surfaces which contact the hot effluent flow.

It is therefore an object of the invention to provide an improved gasifier for producing a usable synthetic gas, in which a gasifier dip tube is wetted by a quench ring which embodies an internal water circulatory system.

A further object is to provide a liquid carrying quench ring for a gasifier, which ring is protected from exposure to the hot effluent produced by the gasification process through means of an internal water circulating channel.

A still further object is to provide a quench ring of the type contemplated which embodies an efficient internal cooling system to reduce development of thermally induced strains in the ring's metallic structure.

Figure 1:
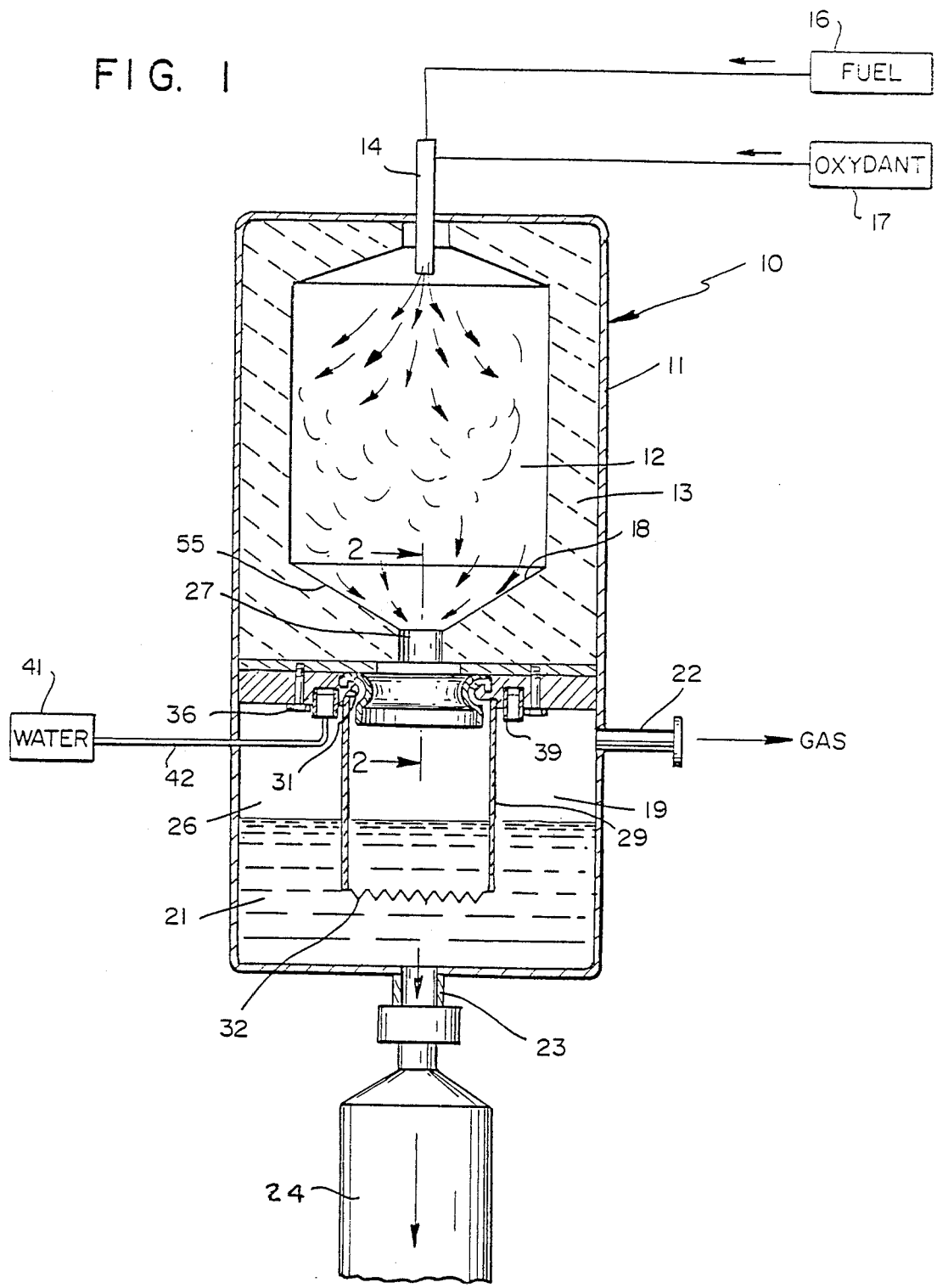
FIG. 1 is a vertical elevation view in cross-section of a gasifier reactor of the type contemplated.

Briefly stated, in achieving the above objectives, and referring to FIG. 1, there is provided a gasifier or reactor vessel for gasifying a carbonaceous fuel mixture either solid, liquid or gaseous. The gasification process, by way of partial oxidation, produces a hot effluent which includes at least one useful synthetic gas, and a residue normally in the form of particulated ash, when the fuel is a solid such as coal or coke. The gasifier is enclosed in a heavy wall, upright steel shell which is positioned to form a downflowing stream of the hot effluent which includes the produced synthesis gas.

A reaction chamber within the shell receives a pressurized stream of a fuel mixture by way of a fuel injection burner. The latter is communicated with a source of the carbonaceous fuel, as well as with a source of a gasification supporting medium such as oxygen or air to form a combustible mixture.

The products of gasification, or the hot effluent which is generated in the reaction chamber, is discharged through the reaction chamber floor to be cooled in a liquid holding quench chamber.

To facilitate passage of the hot effluent as it leaves the reaction chamber, a dip tube is positioned to guide the hot stream into the liquid bath. The dip tube, oriented in a generally upright position, is supported by a liquid conducting quench ring which directs a stream or streams of water along the dip tube's exposed guide face or effluent contacting wall.

Referring to FIG. 1, a gasifier or reactor vessel 10 of the type contemplated embodies an elongated metallic steel wall shell 11. The gasifier reactor is normally operated in an upright position to form a downflowing stream of produced product. Shell 11 includes a reaction chamber 12 at the upper end to withstand the expected high operating temperatures between about 2,000° to 3,000° F. Chamber 12 is provided with a lined multi-layer inner wall 13 preferably formed of a suitable refractory material.

A burner 14 is removably positioned at shell 11 upper wall or roof to inject the carbonaceous fuel mixture such as particulated coal or coke, from a source 16, into reaction chamber 12. An amount of the gasification supporting medium from a pressurized source 17 is concurrently fed into burner 14 as a part of the fuel mixture.

The invention can be applied equally as well to gasifiers which burn a variety of carbonaceous solid, liquid, or gaseous fuels. To illustrate the instant embodiment, it will be assumed that burner 14 is communicated with a source 16 of coke. The latter is preferably preground and formed into a slurry of desired consistency by the addition of a sufficient amount of water. The pressurized gas at source 17 is normally oxygen, air or a mixture thereof.

The lower end of reaction chamber 12 is defined by a downwardly sloping refractory floor 18. This configuration enhances the discharge of the hot gas, and particularly liquefied effluent from reaction chamber 12.

The lower end of shell 11 encompasses a quench chamber 19 into which the products of gasification are directed. Here, both solid and gaseous products contact, and are forced into liquid bath 21 which is most conveniently comprised of water. The cooled gas then emerges from quench chamber 21 into disengaging zone 26, before leaving the gasifier by way of line 22. The cooled gas can now be processed in downstream equipment and operations into usable form. The solid or slag component of the effluent sinks through bath 21 to be removed by way of discharge port 23 into lockhopper 24.

Reaction chamber 12 and quench chamber 19 are communicated through constricted throat 27 formed in the reaction chamber floor 18. To achieve efficient contact of the hot effluent as it leaves reaction chamber 12, with the liquid in bath 21, quench chamber 19 as noted is provided with a dip tube 29. The latter includes an uppr edge 31 positioned adjacent to the downstream side of constricted throat 27. Dip tube 29 further includes a lower edge 32 which terminates in the coolant bath 21.

Figure 2:
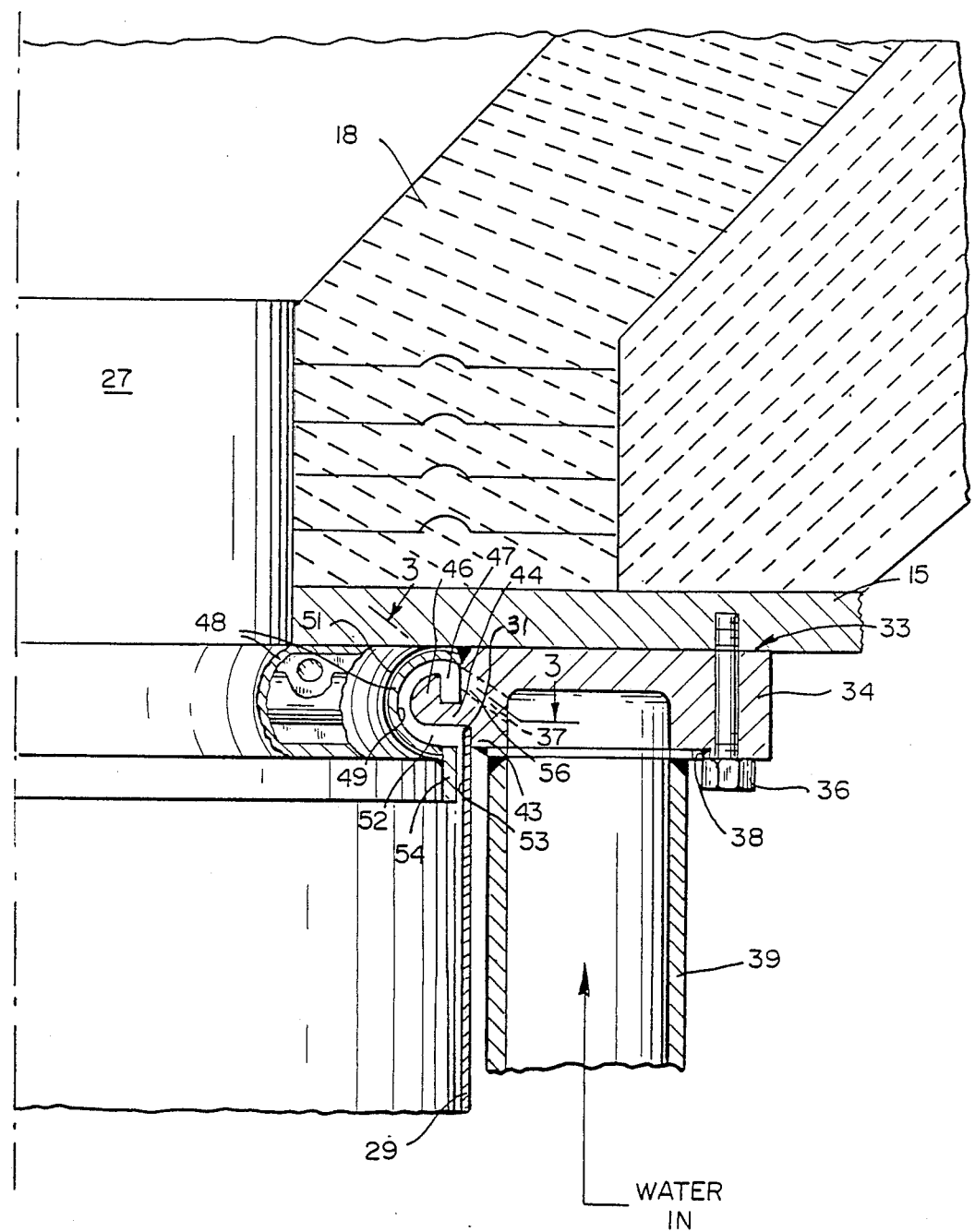
FIG. 2 is a segmentary enlarged view of the internally channelled quench ring in FIG. 1.

Referring to FIG. 2, constricted throat 27 defines the guide passage through which the high temperature, high pressure effluent initially passes. Cooling of the slag as well as produced gas is achieved by immersion in quench chamber 19 (FIG. 1) to permit the gas to be readily handled. However, as the hot effluent leaves the downstream side of throat 27 it will expand outwardly and be guided by the exposed exterior face of quench ring 33 wall which serves as a water distribution ring.

Functionally, the inner wall of dip tube 29 defines a cylindrical guide surface for the hot, downwardly flowing effluent, including both the gaseous and solid components which leave throat 27 in a high velocity stream. Beneficially, and to facilitate effluent flow, the inner wall or guide surface of the cylindrical dip tube 29 is wetted, as noted, by directing one or more pressurized streams of water thereagainst.

In one embodiment of quench ring 33, the latter is comprised of a toroidal metallic body 34 which is fastened by a series of bolts 36 to the lower support floor 15 of combustion chamber 12. Refractory 18 as shown, extends inwardly a sufficient distance to overhang and protect at least a part of the quench ring from direct impingement of the hot gases.

Said toroidal body 34 is shaped to define an internal annular manifold or chamber 37 for carrying the coolant water. The underside of the toroidal body 34 is provided with a plate 38 which can be removable or can be welded in place, and which accommodates at least one, and preferably a plurality of risers 39. The latter, as shown in FIG. 1, are communicated with a pressurized source of the water 41 by way of conduit 42.

An inner or intermediate wall 43 of body 34 is provided with a peripheral mounting hub to which the upper end 31 of cylindrical dip tube 29 is supportably fastened. Said wall 43 is further provided along its external surface with an annular appendage comprised of a generally horizontal neck 44. An upright rim 46 extends from neck 44 to define an annular coolant circulating channel 47. Said channel 47 thereby covers and cools the entire contact face 49 of the quench ring exposed wall.

The exposed external or outer surface 51 of toroidal body 34 is provided with an effluent guide panel or cover 48 which depends therefrom, and whose internal surface 49 is spaced from said appendage 44–46 to define the narrow or constricted annular coolant channel 47.

The external, exposed face 51 of effluent guiding panel 48 is appropriately curved to facilitate passage of, and to minimize interference with the rapid downflow of the hot effluent which contacts said surface. In one embodiment, the external convex surface 51 defines an uper portion of the effluent guide stream. A lower, generally circular portion of said exposed face guides the effluent downwardly into contact with dip tube 33 contact surface. As presently shown, surface 51 can take the configuration of an arcuate or semi-circular curvature to facilitate passage of the effluent flow.

The narrow coolant channel 47 is provided at its underside with an exit or expanded reservoir 52 into which the coolant water is forced prior to its leaving the coolant channel by way of one or more constricted discharge ports 53. In a preferred embodiment, the continuous discharge opening of 53 and 54 comprises a narrow passage defined between the downwardly extending edge of panel 48 and the dip tube 29 surface. To maintain the constricted opening 53, spacers 54 can be positioned in a manner that the opening will not, over a period of time, close.

Figure 3:
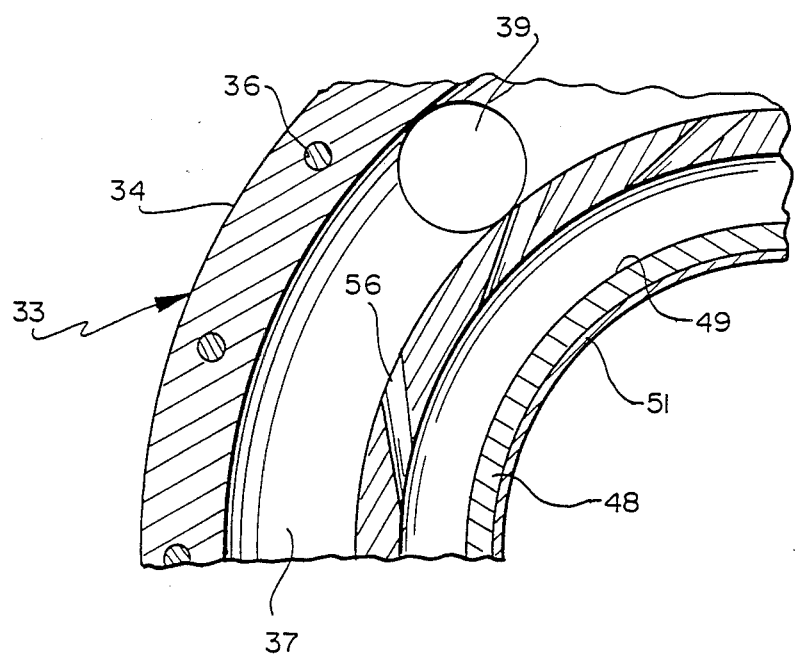
FIG. 3 is a segmentary enlarged view taken along line 3—3 in FIG. 2.

Referring to FIGS. 2 and 3, to introduce water from the coolant carrying manifold 37 to constricted channel 47, one or more cross passages 56 are formed in the intermediate wall 43. Cross passages 56 extend preferably from the upper portion of manifold chamber 37, into the upper portion of the coolant channel 47. The series of cross passages 56 are preferably equispaced about the periphery of intermediate wall 43. More preferably they are arranged to provide a series of flow streams which enter coolant channel 47 substantially tangential to the channel walls whereby to induce a rapid, swirling action or flow to the coolant before it is passed downwardly into discharge port 53.

The arrangement of the coolant water flow from manifold 37 to discharge port 53 has several advantages. Primarily, the positioning of passages 56 assure that channel 47 will always be full of water. As a consequence, and due to its circular flow, the water will overflow rim 46 and contact the inner face or surface 48.

This more uniform, efficient cooling action will assure that the outer exposed face 51 will likewise be subject to cooling. The overall effect is the elimination of any part of the external, exposed face 51 or of panel 48 which will tend to develop stress cracks.

It is understood that although modifications and variations of the invention may be made without departing from the spirit and scope thereof, only such limitations should be imposed as are indicated in the appended claims.

I claim:

1. In a gasifier for the high temperature gasification of a carbonaceous fuel mixture to produce a hot effluent stream comprised of at least one usable synthetic gas, which gasifier comprises a shell having a reaction chamber in which the fuel mixture is at least partially reacted at an elevated temperature and pressure, a quench chamber in said shell holding a liquid bath for cooling said hot effluent stream, means forming a throat communicating the respective reaction chamber and quench chamber, and an elongated dip tube positioned adjacent to said means forming said throat, having a contact face which defines an effluent guide passage for conducting said hot effluent stream toward said bath, the improvement therein of a quench ring positioned downstream of said throat and comprising a toroidal shaped body including means forming an annular liquid conducting manifold having an inner wall with an appendage extending outwardly therefrom in a direction toward said effluent guide passage, a liquid distribution ring depending from said toroidal shaped body, being spaced from said appendage to define a constricted, annular liquid circulating channel therebetween, cross passage means communicating said liquid circulating channel with said liquid conducting manifold, and means forming at least one discharge port in said liquid distribution ring being aligned with said dip tube contact face to direct a stream of liquid coolant thereagainst.

2. In the apparatus as defined in claim 1, wherein said distribution ring is provided with a convex external surface which defines a central opening in alignment with said means forming said throat.

3. In the apparatus as defined in claim 1, wherein said cross passage means includes a plurality of spaced apart liquid conducting passages which open into said liquid circulating channel substantially tangential to the wall of the latter.

4. In the apparatus as defined in claim 1, wherein said liquid circulating channel includes
a narrow upstream portion, and an expanded exit channel which opens into said at least one discharge port.

5. In an apparatus as defined in claim 1, wherein said appendage includes
a neck portion which depends outwardly from said inner wall,
a rim which depends from said neck having a convex surface spaced from the liquid distribution ring to define said constricted liquid circulating channel.

* * * * *